United States Patent [19]

Min et al.

[11] Patent Number: 5,166,583
[45] Date of Patent: Nov. 24, 1992

[54] DRIVING METHODS AND DRIVING CIRCUITS FOR BRUSHLESS DC MOTORS WITHOUT ROTOR POSITION SENSORS

[75] Inventors: Byung H. Min, Seoul; Seung K. Park, Kyungki-Do, both of Rep. of Korea

[73] Assignees: Goldstar Co., Ltd., Seoul; Goldstar Electron Co., Ltd., Choongchungbook-Do, both of Rep. of Korea

[21] Appl. No.: 620,146

[22] Filed: Nov. 30, 1990

[30] Foreign Application Priority Data

Nov. 30, 1989 [KR] Rep. of Korea ........... 17906/1989[U]
Oct. 26, 1990 [KR] Rep. of Korea ........... 17247/1990[U]

[51] Int. Cl.⁵ .............................................. H02P 7/00
[52] U.S. Cl. ..................................... 318/138; 318/254
[58] Field of Search ........... 318/439, 132, 254, 254 A, 318/269, 434, 6, 696, 685, 739, 740, 747, 763, 779, 799, 806, 809; 388/805, 812, 817, 820, 904, 911, 912

[56] References Cited

U.S. PATENT DOCUMENTS

| | | | |
|---|---|---|---|
| 3,597,672 | 8/1971 | Seesselberg et al. | 318/269 |
| 3,624,474 | 11/1971 | Nolf | 318/254 |
| 3,624,837 | 11/1971 | Albarda | 318/254 |
| 3,678,358 | 7/1972 | Kolatorowicz | 318/254 |
| 3,683,253 | 8/1972 | Rummel et al. | 318/254 |
| 3,840,790 | 10/1974 | Stich et al. | 318/254 |
| 3,860,187 | 1/1975 | Liska et al. | 318/6 X |
| 4,070,606 | 1/1978 | Morozumi et al. | 318/254 |
| 4,743,815 | 5/1988 | Gee et al. | 318/254 |
| 4,746,844 | 5/1988 | MacKelvie et al. | 318/254 |
| 4,924,166 | 5/1990 | Roussel | 318/817 X |

FOREIGN PATENT DOCUMENTS 58-172994 10/1983 Japan .

*Primary Examiner*—A. Jonathan Wysocki
*Attorney, Agent, or Firm*—Rosen, Dainow & Jacobs

[57] ABSTRACT

A sensorless and brushless DC motor in which phase-corresponding coils are turned on at an electric angle of 180°.

The driving circuit of the DC motor includes comparators for outputting position detection signals, comparators for outputting turn-on signals, power transistors for turning on phase-corresponding coils, a rotation direction control section, a charge/discharge control section, a charge/discharge section, a turn-off signal generating section, and transistors for forcedly turning off the power transistors.

9 Claims, 7 Drawing Sheets

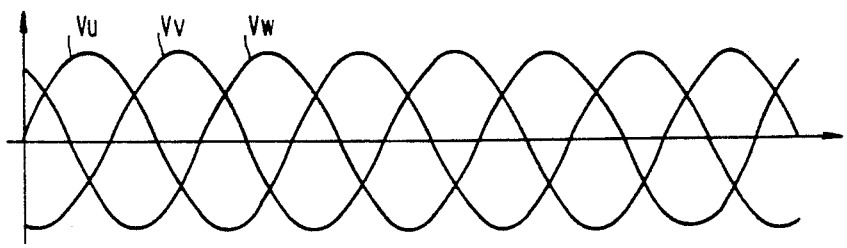
FIG.IIA
FIG.IIB
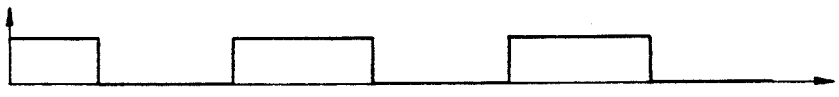
FIG.IIC
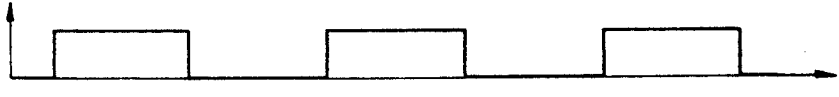
FIG.IID
FIG.IIE

DRIVING METHODS AND DRIVING CIRCUITS FOR BRUSHLESS DC MOTORS WITHOUT ROTOR POSITION SENSORS

BACKGROUND OF THE INVENTION

The present invention relates to driving circuits for a rotor position sensorless, i.e. not having a rotor position sensor, brushless DC motor, more particularly to driving methods and driving circuits for a brushless DC motor which enable high speed functions of the DC motor to be attained in a DC motor-used headphone-type stereophonic product, by enhancing the maximum speed of a rotor position sensorless brushless DC motor.

In general, a rotor position sensorless brushless three-phase DC motor can be minimized in its size because it has no rotor position sensor. According to this, its application to a light, thin and simplified product such as a headphone-type stereophonic product or the like is very useful.

In the meantime, since it is a general trend to use a single dry cell of 1.5 voltages as a power supply in a product such as a headphone-type stereophonic product or the like, the driving method for the rotor position sensorless brushless three-phase DC motor used in the product should be also active under a low voltage.

Thus, the unipolar driving method which allows only a one-directional current flow in the motor coils can not be employed because of the problems caused by the integration of PNP power transistors and a voltage drop between the collector and emitter of the power transistor.

FIG. 1 is waveforms showing the relationship between induced voltages which are back electromotive forces in accordance with phases of the brushless DC motor and turn-on time periods, having laid open in Japanese laid-open patent publication No. 58-172994.

As shown in FIG. 1, a phase difference of an electric angle $\frac{2}{3}\pi$ exists among the induced voltages Eu, Ev, Ew in accordance with the respective phases.

That is, a 120° phase difference exists as shown below in equations (1), (2) and (3).

$$Eu = \sin \theta \quad (1)$$

$$Ev = \sin\left(\theta - \frac{2}{3}\pi\right) \quad (2)$$

$$Ew = \sin\left(\theta - \frac{4}{3}\pi\right) \quad (3)$$

When the motor rotates in a sequential order of u, v and w phases, 60° before and 60° after the moment that each of the phases generates the maximum torque, i.e. 120°, become one of the turn-on time periods Tu, Tv, Tw of the respective phases.

The turn-on time periods Tu, Tv, Tw of the respective phases can be expressed as in equations (4), (5) and (6).

$$Tu(t1-t2) = \frac{Ev}{2} + Eu \leq Vs \rightarrow \frac{Ew}{2} + Ev = Vs \quad (4)$$

$$Tu(t2-t3) = \frac{Ew}{2} + Ev \leq Vs \rightarrow \frac{Eu}{2} + Ew = Vs \quad (5)$$

$$Tu(t3-t4) = \frac{Eu}{2} + Ew \leq Vs \rightarrow \frac{Ev}{2} + Eu = Vs \quad (6)$$

FIG. 2 shows a conventional brushless DC motor driving circuit applied to the driving method of FIG. 1.

As shown in FIG. 2, it is constructed by coils 1u, 1v, 1w correspondent with phases (hereinafter, referred to as phase-corresponding coils), resistors R1, R2 for extracting a rotor position information by using back electromotive forces of the phase-correspondign coils 1u, 1v, 1w, comparators 3u, 3v, 3w for determining which of the phase-corresponding coils 1u, 1v, 1w is selected, power transistors Q1, Q2, Q3 for making a current flow through the selected one of the phase-corresponding coils 1u, 1v, 1w, and transistors Q4, Q5, Q6 for turning off by means of the turn-on signal of a next coil one of the phase-corresponding coils 1u, 1v, 1w which is active.

The operation of the conventional circuit will be described below with reference to the waveforms of FIG. 1.

Referring to FIG. 1, a high potential signal output from the comparator 3u at time t1 makes the transistor Q1 turn on so that an electric current flows through a coil 1u for the u phase (hereinafter, referred to as a u-phase coil). That is, at this time, the transistor Q4 is forced to be turned off because the transistor Q2 is turned off and the transistor Q7 is turned on.

Accordingly, at this time, since the power supply $V_s$ is applied to the non-inverting input terminal of a comparator 3u and a bit lower voltage than the power supply Vs is applied to the inverting input terminal of the comparator 3u, the output of the comparator 3u becomes high potential. This high potential signal causes a transistor Q1 to be turned on so that an electric current flows through the u-phase coil 1u. And also, at this time, since the turn-on of the transistor Q1 makes a transistor Q9 turn off and thus a transistor Q6 is turned on, the low potential signal applied to the non-inverting input terminal of the comparator 3w makes its output low potential.

Since the low potential signal turns the transistor Q3 off so that no electric current flows through a coil 1w for the w phase (hereinafter, referred to as a w-phase coil) and also the turn-off of said transistor Q3 makes a transistor Q8 turn on so that a transistor Q5 is turned off, the power supply Vs is applied to the non-inverting input terminal of the comparator 3v.

However, at this time, since the voltage of a connection point (v) applied to the non-inverting input terminal of the comparator 3v becomes higher than the power supply Vs and thus the output of the comparator 3v appears low potential, a transistor Q2 is turned off.

According to such operations as mentioned above, when the time t2 of FIG. 1 is met with a 120° rotation of the rotor, since the voltage at the connection point (v) becomes a bit lower than the power supply Vs and thus the output of the comparator 3v becomes high potential, the transistor Q2 is turned on so that an electric current flows through a coil 1v for the v phase (hereinafter, referred to as v-phase coil). At this time, the turn-on of the transistor Q2 makes the transistor Q7 turn off so that the transistor Q4 is turned on, causing the output of the comparator 3u to be low potential.

Since the low potential signal makes the transistor Q1 turn off, no electric current flows through the u-phase coil 1u.

And also, at this time, since the turn-off of the transistor Q1 leads a transistor Q9 to a turn-on state, the transistor Q6 is turned off so that the power supply Vs is applied to the non-inverting input terminal of the comparator 3w.

At this time, since the voltage at a connection point (W) applied to the inverting input terminal of the comparator 3w becomes higher than the power supply Vs, the output of the comparator 3w becomes low potential.

The low potential signal causes the transistor Q3 to be turned off so that no electric current flows through the w-phase coil 1w.

According to such operations as mentioned above, when time t3 of FIG. 1 is met with a 120° rotation of the rotor, since the state of one of the circuits for the respective phases, as described above, moves to an adjacent phase, an electric current flows through the w-phase coil 1w while stopping of an electric current flow occurs in the v-phase coil 1v and no electric current flow is kept in the u-phase coil 1u.

According to such operations as mentioned above, when time t4 of FIG. 1 is met with another 120° rotation of the rotor, the procedures since the time t1 as described above are iterated.

According to this, rotational magnetic fields are generated in a sequential order of u, v and w phases while sequentially satisfying said equations 4, 5 and 6.

However, in the above-mentioned conventional circuit, since the motor makes a turn-on of only 120° of the electric angle 180° which generates the positive torque, torque ripples occur to prevent the rotations of the motor from being smooth so that the entire torque decreases.

And also, the maximum speed of the motor is limited to the Wmax speed at the maximum voltage.

Accordingly, the conventional circuit has a drawback in that high speed functions such as CUE and REVIEW are impossible at all and also fast forward FF and rewind REW speeds are limited by the Wmax speed and a load of the motor in case that it is applied to a product such as a headphone-type stereophonic product or the like.

The conventional rotor position sensorless brushless DC motor detects the speed of a DC motor by means of a frequency generating signal generated in a frequency generating FG coil. For this, the conventional rotor position sensorles brushless DC motor is attached with a separate frequency generating coil and also a magnet for exclusively generating a frequency or a magnet for generating a torque in an electromagnetic coil in order to induce a voltage in said frequency generating coil according to the rotation of the DC motor.

Since a separate frequency generating coil is used in order to detect a speed of the DC motor in the speed detection method for the above-mentioned conventional DC motor, the conventional circuit has another drawback in that a difficulty in manufacturing and making smaller a DC motor takes place and a precise speed detection of the DC motor is not obtained.

SUMMARY OF THE INVENTION

It is, therefore, an object of the present invention to provide a driving method and driving circuits for a rotor position sensorless brushless DC motor which smoothly performs a double speed function in a product such as a headphone-type stereophonic product or the like by leading each of the phase-corresponding coils of the rotor position sensorless brushless DC motor to a turn-on during an electric angle of 180° period in order to enhance the maximum speed of the DC motor, that has less torque ripple and a more enhanced rotational torque than the conventional circuits, and that performs a rapid rotational direction change of the motor with an automatic brake of the motor when a reverse rotation signal is input during a forward rotation.

It is another object of the present invention to provide a speed detection method for the rotor position sensorless brushless DC motor which directly detects a speed of the DC motor by a back electromotive force generated from each of the phases of the DC motor without use of a separate frequency generating coil.

Such objects of the present invention can be attained by:

obtaining a rotor position detection signal with comparing a back electromotive force of a phase-corresponding coil of the three-phase motor with back electromotive forces of other phase-corresponding coils, obtaining a phase-corresponding turn-on signal for turning on said phase-corresponding coil with comparing said back electromotive force with a common voltage, obtaining a charge/discharge control signal by said position detection signal and a rotation direction control signal which said phase-corresponding turn-on signal is generated in a predetermined order according to a forward/reverse direction control signal, obtaining a turn-off decision signal by the charge/discharge control signal, obtaining a turn-off signal for forcing said phase-corresponding coil into a turn-off by said turn-off decision signal, position detection signal and forward/reverse direction control signal, turning said phase-corresponding coil on during an electric angle of 180° period by said phase-corresponding turn-on signal and turn-off signal, and generating a high potential frequency generating signal at the state that two phase-corresponding turn-on signals are generated with a logic combination of said phase-corresponding turn-on signal.

DETAILED DESCRIPTION OF THE INVENTION

The present invention will be described in detail with reference to the accompanying drawings.

Figure 3:
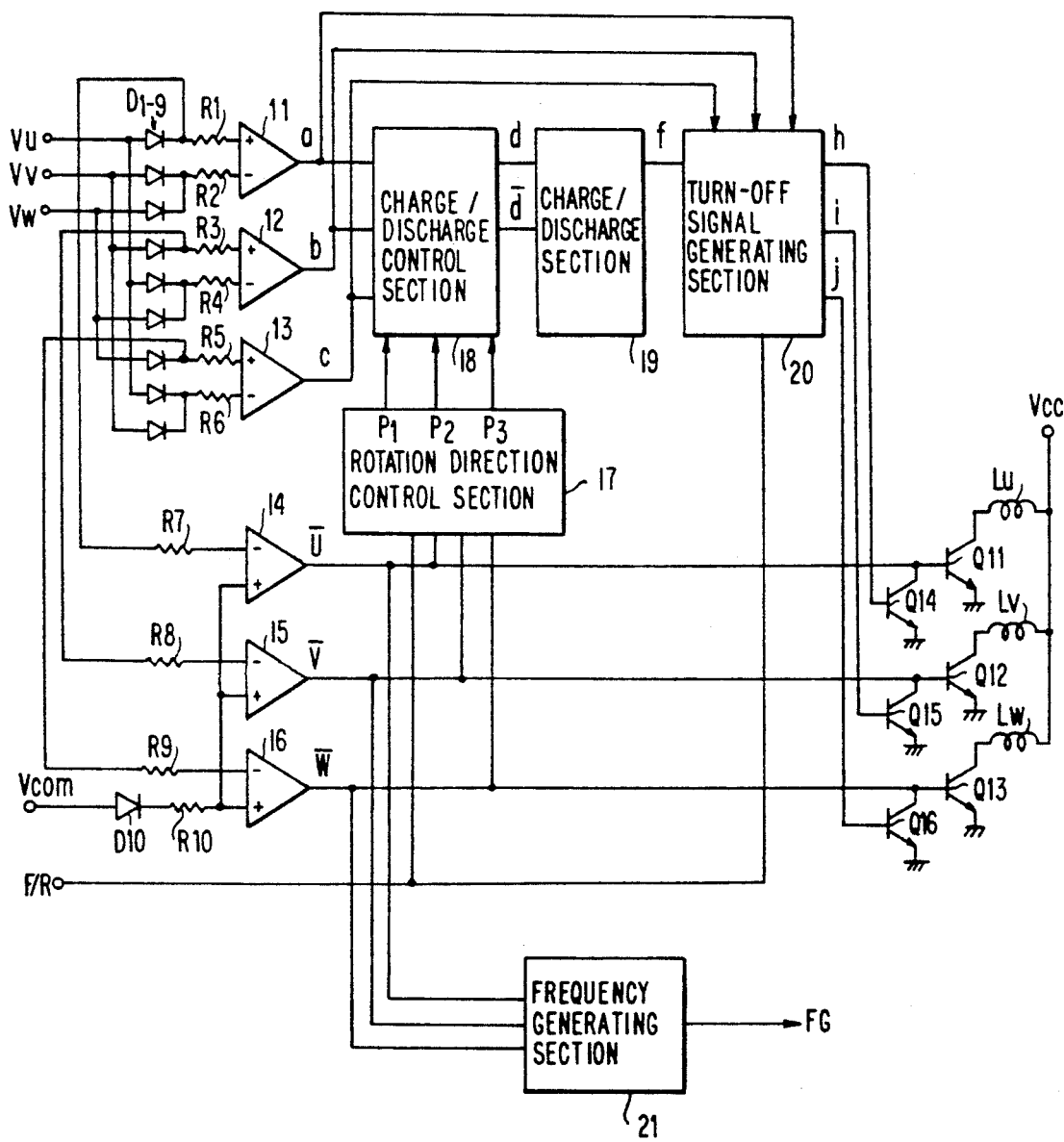
FIG. 3 is a block diagram for the DC motor driving circuits according to the present invention.

FIG. 3 is a block diagram for the DC motor driving circuits consisting of:

phase-corresponding coils Lu, Lv, Lw of a three-phase motor, comparators 11, 12, 13 for generating position detection signals a, b, c of a rotor from comparing reverse electromotive forces Vu, Vv, Vw of said phase-corresponding coils Lu, Lv, Lw with back electromotive forces (Vv, Vw), (Vu, Vw), (Vu, Vv) of other phase-corresponding coils, comparators 14, 15, 16 for generating phase-corresponding turn-on signals $\bar{u}$, $\bar{v}$, $\bar{w}$ from comparing a common voltage Vcom with said back electromotive forces Vu, Vv, Vw, power transistors Q11, Q12, Q13 for making an electric current flow in said phase-corresponding coils Lu, Lv, Lw which are turned on by said phase-corresponding turn-on signals $\bar{u}$, $\bar{v}$, $\bar{w}$, a rotation direction control section 17 for generating rotation direction control signals in a predetermined order by a forward/reverse direction control signal F/R and said phase-corresponding turn-on signals, $\bar{u}$, $\bar{v}$, $\bar{w}$, a charge/discharge control section 18 for generating charge and discharge control signals d, $\bar{d}$ by the control signal of the rotation direction control section 17 and said position detection signals a, b, c, a charge/discharge section 19 for generating a turn-off decision signal f by being charged and discharged by the charge/discharge control signals, d, $\bar{d}$ of the charge/discharge control section 18, a turn-off signal generating section 20 for generating phase-corresponding turn-off signals h, i, j by the turn-off decision signal f of the charge/discharge section 19, said position detection signals a, b, c and said forward/reverse rotation control signal F/R, transistors Q14, Q15, Q16 for forcing said power transistors Q11, Q12, Q13 into a turn-off which are turned on by the turn-off signals h, i, j of the turn-off signal generating section 20, and a frequency generating section 21 for generating a high potential pulse signal only at the state that two phase-corresponding turn-on signals ($\bar{u}$, $\bar{v}$), ($\bar{v}$, $\bar{w}$), ($\bar{w}$, $\bar{u}$) of said phase-corresponding turn-on signals $\bar{u}$, $\bar{v}$, $\bar{w}$ are generated.

The reference numerals D1–D10 of FIG. 3 designate diodes for preventing a reverse electric current flow. The reference numerals R1–R10 designate resistors.

Figure 4:
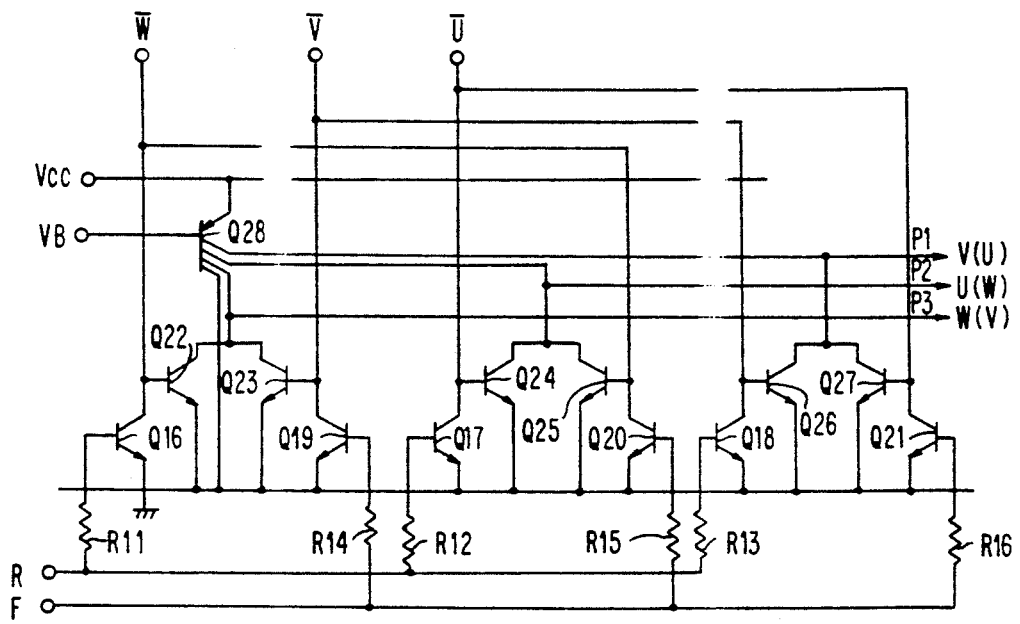
FIG. 4 is a detailed circuit for the rotation direction control section of FIG. 3.

FIG. 4 shows a detailed circuit for a rotation direction control section of FIG. 3. As shown in FIG. 4, a reverse direction control signal R is applied to the bases of transistors Q16–Q18 through resistors R11–R13 and a forward direction control signal F is applied to the bases of transistors Q19–Q21 through resistors R14–R16. The phase-corresponding turn-on signals $\bar{u}$, $\bar{v}$, $\bar{w}$ are, respectively, applied in common to the collectors of transistors Q17, Q21, the collectors of transistors Q18, Q19 and the collectors of transistors Q16, Q20 as well as to the bases of transistors Q24, Q27, the bases of transistors Q23, Q26 and the bases of transistors Q22, Q25. The collectors of the transistors Q26, Q27 are connected to each other, and so are the collectors of the transistors Q24, Q25 and the collectors of the transistors Q22, Q23, the three collectors resulting from said connections are again connected to the multiple collectors of transistor Q28, respectively, whose base is provided with a bias voltage $V_B$, and a rotation direction control signal is generated from each of the connection points P1, P2, P3.

Figure 5:
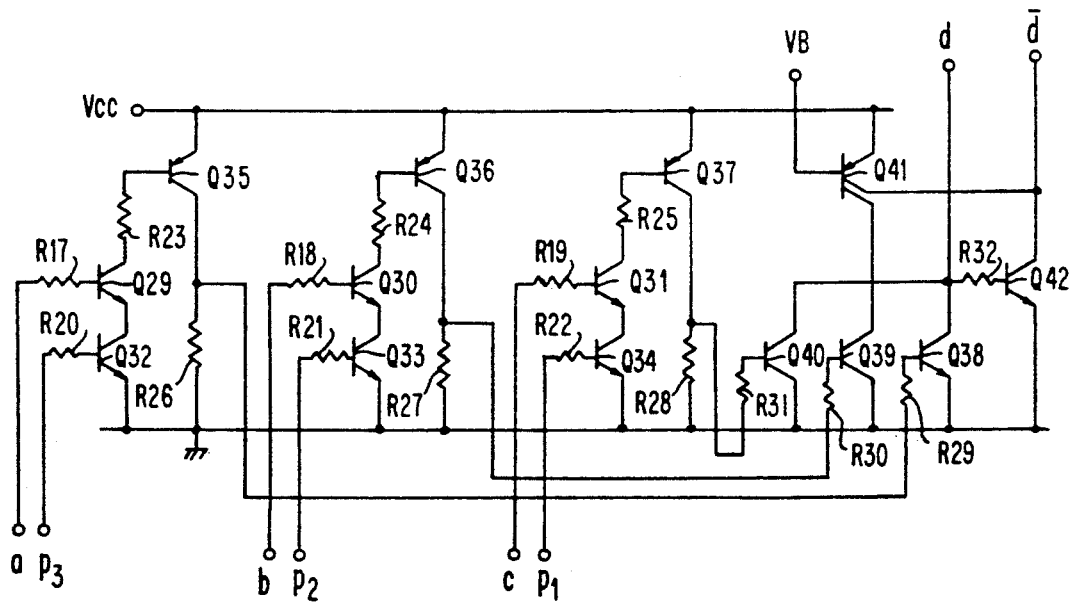
FIG. 5 is a detailed circuit for the charge/discharge control section of FIG. 3.

FIG. 5 shows a detailed circuit of a charge/discharge control section of FIG. 3. As shown in FIG. 5, signals of the connection points P3, P2, P1 and the rotor position detection signals a, b, c which are outputs of said comparators 11–13 are, respectively, connected to the bases of transistors Q29–Q34 through the resistors R17–R22. The emitters of the transistors Q29–Q31 are connected to the collectors of the transistors Q32–Q34, respectively, the collectors of the transistors Q29–Q31 are, respectively, connected to the bases of the transistors Q35–Q37 through the resistors R23–R25. The collectors of the transistors Q35–Q37 are respectively connected to the resistors R26–R28 and then to the bases of transistors Q38–Q40 through the resistors R29–R31. The collectors of the transistors Q38–Q40 are connected together and then connected to one of the collectors of transistor Q41 whose base is supplied with the bias voltage $V_B$. A charge control signal d is produced at the connection point where the collectors of the transistors Q38–Q40 are connected together. The collectors of the transistors Q38–Q40 which are connected together are also connected to the base of transistor Q42 through the resistor R32. The collector of the transistor Q42 is connected to the other of collectors of said transistor Q41 and the discharge control signal $\bar{d}$ is produced at the point where the collectors of the transistors Q41, Q42 are connected each other.

Figure 6:
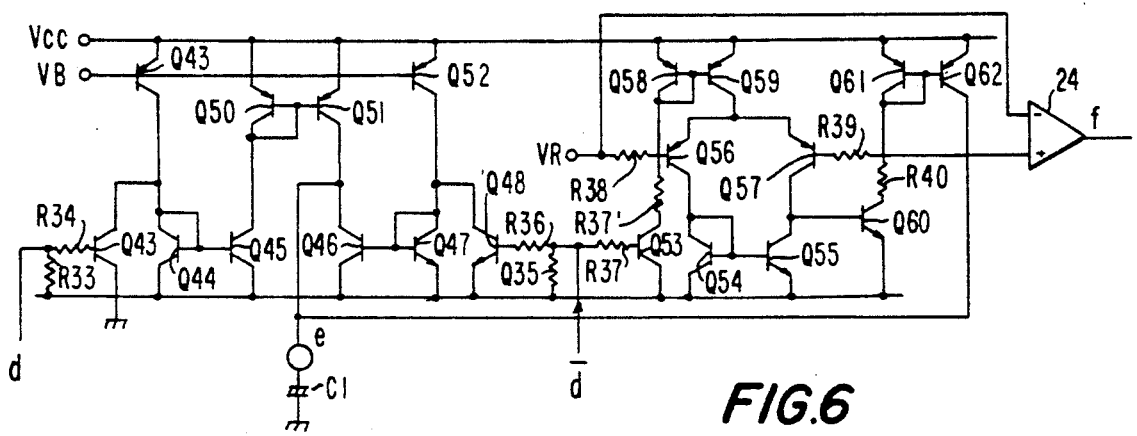
FIG. 6 is a detailed circuit for the charge/discharge section of FIG. 3.

FIG. 6 shows a detailed circuit of a charge/discharge section of FIG. 3. As shown in FIG. 6, the charge control signal d of the charge/discharge control section 18 is applied to the base of transistor Q43 through resistors R33, R34. The collector of the transistor Q43 is connected to the collector of transistor Q49 whose base is provided with the bias voltage $V_B$, the collector and base of the transistor Q44 and then to the base of the transistor Q45. The collector of the transistor Q45 is connected to the collector and base of transistor Q50 and to the base of transistor Q51. The discharge control signal $\bar{d}$ of the charge/discharge control section 18 is applied to the base of the transistor Q48 through the resistors R35, R36 as well as to the base of transistor Q53 through resistor R37. The collector of the transistor Q48 is connected to the collector of the transistor Q52 of which base is supplied with the bias voltage $V_B$, the collector and base of the transistor Q47 and the base of the transistor Q46. The collector of the transistor Q46 is connected to the collector of said transistor Q51, a capacitor C1, the non-inverting input terminal of a comparator 24, the collector of transistor Q62 as well as to the base of transistor Q57 through the resistor R39. The collector of the transistor Q53 is connected to the collector and base of transistor Q58 and the base of the transistor Q59 through the resistor R37. The collector of the transistor Q59 is connected to the emitters of the transistors Q56, Q57. The reference voltage $V_R$ is applied to the inverting input terminal of said comparator 24 as well as to the base of the transistor Q56 through the resistor R38. The collector of the transistor Q56 is connected to the collector and base of the transistor Q54 and the base of transistor Q55. The collector of the transistor Q55 is connected to the collector of said transistor Q57 and the base of transistor Q60. The collector of the transistor Q60 is connected to the base and collector of transistor Q61 and the base of said transistor Q62 through the resistor R40, so that said comparator 24 produces a turn-off decision signal f as an output.

Figure 7:
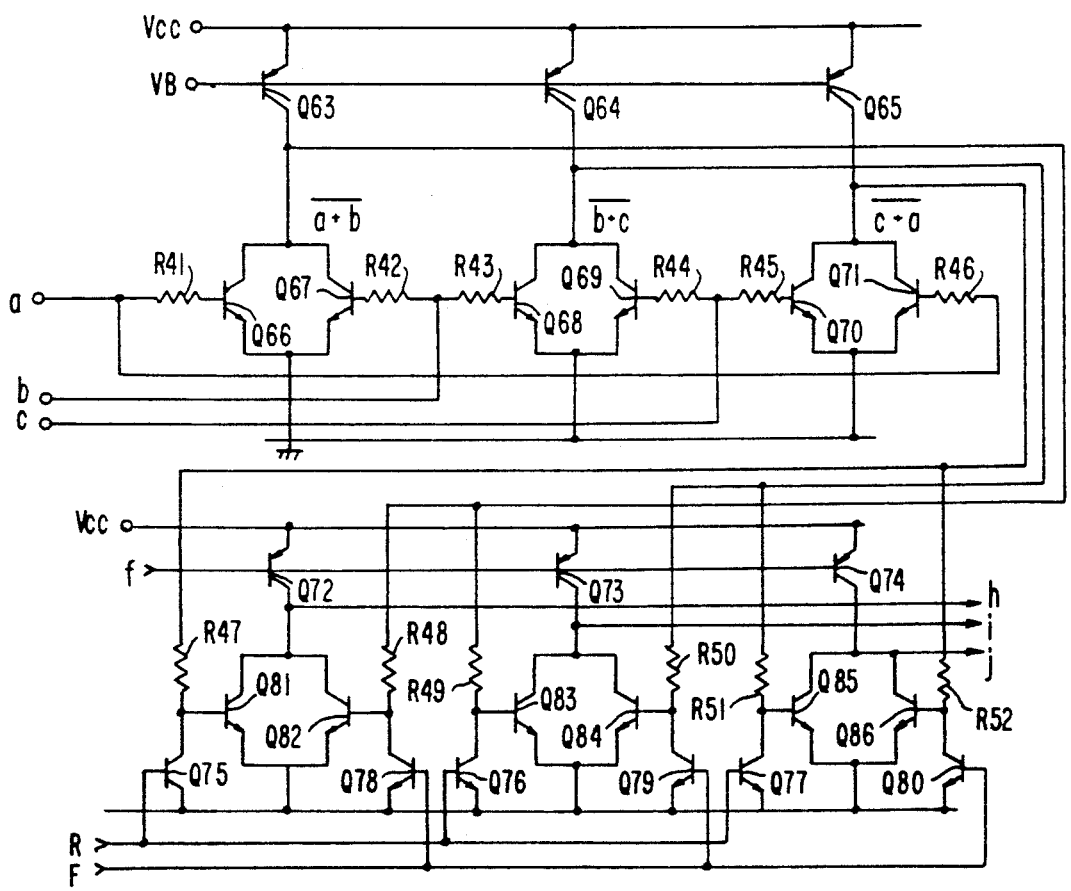
FIG. 7 is a detailed circuit for the turn-off signal generating section of FIG. 3.

FIG. 7 shows a detailed circuit for said turn-off generating section of FIG. 3. As shown in FIG. 7, the respective rotor position detection signals a, b, c which are output signals of said comparators 11, 12, 13 are applied to the bases of transistors (Q66, Q71), (Q67, Q68), (Q69, Q70) through resistors (R41, R46), (R42, R43), (R44, R45). The collectors of the transistors (Q66, Q67), (Q68, Q69), (Q70, Q71) are connected to the collectors of transistors Q63, Q64, Q65 whose bases are supplied with the bias voltage $V_B$, and then connected in common to the collectors of transistors (Q76, Q78), (Q77, Q79), (Q75, Q80) and the bases of transistors (Q82, Q83), (Q84, Q85), (Q81, Q86). The forward direction control signal F and reverse direction control signal R are applied to the base of said transistors (Q78, Q79, Q80), (Q75, Q76, Q77), the turn-off decision signal f of said charge/discharge section 19 is applied to the bases of the transistors Q72, Q73, Q74 whose collectors are respectively connected to the collectors of said transistors (Q81, Q82), (Q83, Q84), (Q85, Q86), so that the phase-corresponding turn-off signals h, i, j are generated at the connection points, respectively.

Figure 1:
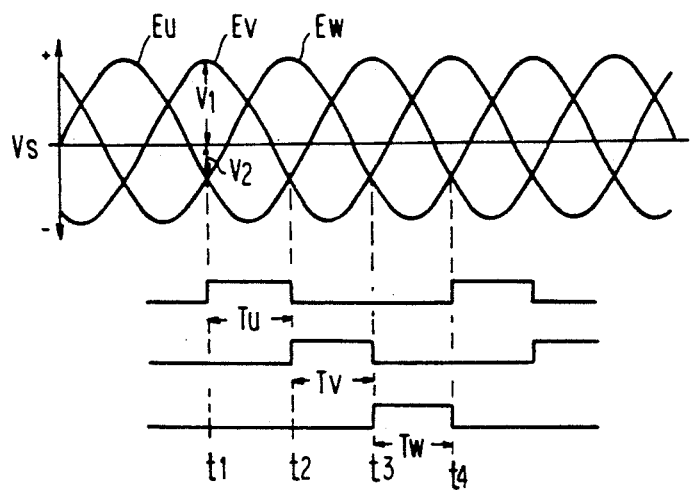
FIG. 1 is waveforms showing the relationship between an induced voltage of each of the phases of a conventional motor and a turn-on time period.
Figure 2:
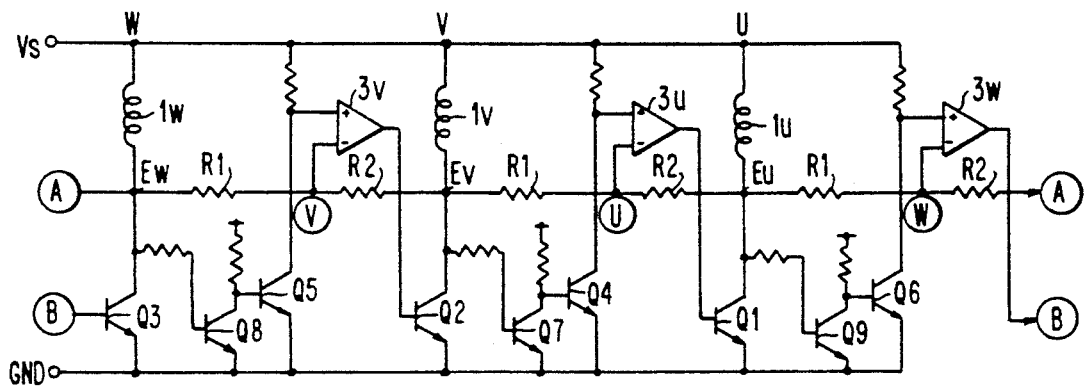
FIG. 2 is a conventional brushless DC motor driving circuit.
Figure 8:
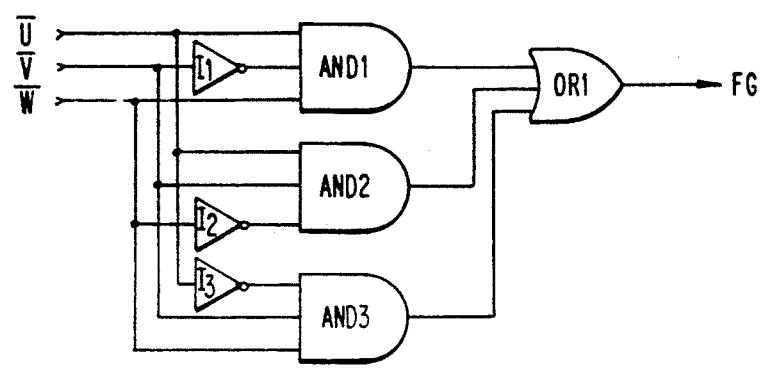
FIG. 8 is a detailed circuit for the frequency generating section of FIG. 3, FIGS. 9A to 9P show output waveforms of each of the sections when rotating in a forward direction of FIG. 3, FIGS. 10A to 10Q show output waveforms of each of the sections when changing the rotation direction of FIG. 3, and FIGS. 11A to 11E show input/output waveforms of FIG. 8.

FIG. 8 shows a detailed circuit for a frequency generating section 21 of FIG. 3. As shown in FIG. 8, the turn-on signals $(\overline{u}, \overline{w})$, $(\overline{u}, \overline{v})$, $(\overline{v}, \overline{w})$ of the phase-corresponding turn-on signals $(\overline{u}, \overline{v}, \overline{w})$ which are generated from the comparators 14, 15, 16 are respectively applied to the input terminals of AND gates AND1, AND2, AND3, said turn-on signals $\overline{v}, \overline{w}, \overline{u}$ are applied to the other input terminals of the AND gates AND1, AND2, AND3 through inverters I1, I2, I3. The output terminals of the AND gates AND1-AND3 are connected to the input terminals of OR gate OR1, so that a frequency generating signal FG is generated from the OR gate OR1.

The operations and effects of the present invention having such a configuration will be described below in detail with reference to the waveforms of FIGS. 9 to 11.

Figure 9A:
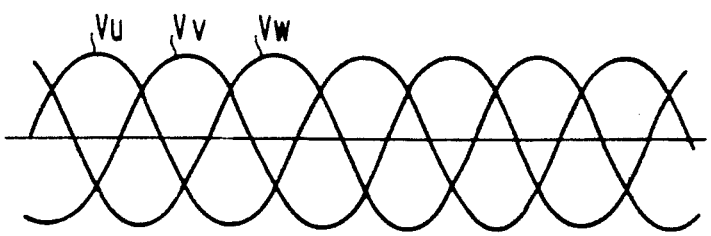
Figure 9B:
Figure 9C:
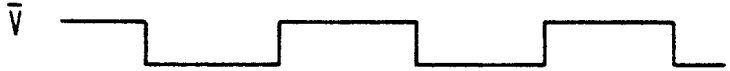
Figure 9D:

The back electromotive forces Vu, Vv, Vw which are phase voltages of the phase-corresponding coils are indicated in FIG. 9A. The reverse electromotive forces Vu, Vv, Vw pass through diodes D1-D3 and then are respectively compared with the common voltage Vcom which has passed through a diode D10, and thus the turn-on signals $\overline{u}, \overline{v}, \overline{w}$ are generated from the comparators 14, 15, 16, as indicated in FIGS. 9B, 9C and 9D, so that the power transistors Q11, Q12, Q13 are turned on.

Figure 9E:

And also, at this time, said back electromotive force Vu is compared at the comparator 11 with other back electromotive forces Vv, Vw which have in turn passed through the diodes D1, D2, D3 a position detection signal a is produced, as shown in FIG. 9E, from the output terminal of the comparator 11.

Figure 9F:
Figure 9G:

In the same way, the back electromotive forces Vv, Vw are, respectively, compared at the comparators 12, 13 with other back electromotive forces (Vu, Vw), (Vu, Vv), so that position detection signals b, c, as shown in FIGS. 9F and 9G, are generated from the comparators 12, 13.

That is, at this time, the position detection signals a, b, c are generated under conditions of Vu-max (Vv, Vw), Vv-max (Vu, Vw) and Vw-max (Vu, Vv). In the meantime, the above-mentioned turn-on signals $\overline{u}, \overline{v}, \overline{w}$ generated from the comparators 14, 15, 16 are, respectively, connected to the collectors of the transistors Q17, Q21, the bases of the transistors Q24, Q27, the collectors of the transistors Q18, Q19, the bases of the transistors Q23, Q26, the collectors of the transistors Q16, Q20 and finally the bases of the transistors Q22, Q25.

Accordingly, at this time, if a high potential forward direction control signal F is applied, the transistors Q19, Q20, Q21 are turned on, so that the transistors Q23, Q25, Q27 are turned off.

Of course, at this time, the reverse direction control signal R is in a low potential state, so that the transistors Q16, Q17, Q18 are kept turned off.

According to this, the transistors Q26, Q24, Q22 are turned on by said turn-on signals $\overline{v}, \overline{u}, \overline{w}$, so that said turn-on signals $\overline{v}, \overline{u}, \overline{w}$ are inverted and outputted at the connection points P1, P2, P3 which are the collectors of the transistors Q26, Q24, Q22, respectively. In the meantime, if a high potential reverse direction control signal R is applied, the transistors Q16, Q17, Q18 are turned on, so that the transistors Q22, Q24, Q26 are turned off.

Of course, at this time, the forward direction control signal F is in a low potential state, so that the transistors Q19, Q20, Q21 are kept turned off.

According to this, with the same operations as described above, said turn-on signals $\overline{v}, \overline{u}, \overline{w}$ are inverted and outputted at the connection points P1, P2, P3. Signals from the connection points P1, P2, P3 of the rotation direction control section 17 are, respectively, applied to the bases of the transistors Q34, Q33, Q32, and said position detection signals a, b, c are, respectively, applied to the bases of the transistors Q29, Q30, Q31 of the charge/discharge control section 18.

Figure 9H:

Accordingly, in a state that said turn-on signals $\overline{v}, \overline{u}, \overline{w}$ are inverted and outputted from the connecting points P1, P2, P3 of the rotation direction control section 17, transistors Q29, Q32 are turned on and transistor Q35 is turned on when the turn-on signal $\overline{w}$ is low potential and the position detection signal a is high potential, and since the high potential signal outputted from the collector of the transistor Q35 leads a transistor Q38 to be turned on, the charge control signal d becomes low potential as shown in FIG. 9H. Similarly, transistors Q30, Q33 are also turned on when the turn-on signal u is low potential and the position detection signal are high potential, transistor Q36 is turned on and transistor Q39 is turned on so that the charge control signal d becomes low potential as shown in FIG. 9H.

Consequently, assuming that the inverted signals of the turn-on signals u, v, w are u, v, w, respectively, under the forward directional rotation state, the charge control signal d is outputted as below logic equation (7) from the signals u, v, w and the position detection signals a, b, c.

$$d = \overline{a \cdot w + b \cdot u + c \cdot v} \qquad (7)$$

Similarly, under the reverse directional rotation state the charge control signal is outputted as below logic equation (8).

$$d = \overline{a \cdot v + b \cdot w + c \cdot u} \qquad (8)$$

And the discharge control signal $\overline{d}$ is a signal that the charge control signal d is inverted by a transistor Q42.

The charge/discharge control signals d, $\overline{d}$ outputted from the charge/discharge control section 18 are applied to base sides of transistors Q43, Q48, Q53 of the charge/discharge section 19.

Figure 9I:
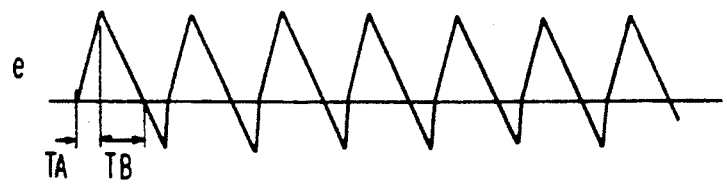

Accordingly, at this time, in case that the charge control signal d is low potential the transistor Q43 is turned off and transistors Q44, Q45, Q50, Q51 are turned on. And, since the discharge control signal d is high potential, the transistor Q48 is turned on in order to turn the transistors Q46, Q47 off. Thus, the high potential signal outputted by the turning-on of the transistor Q51 is charged instantly in a capacitor C1 as shown in FIG. 9I, thereby increasing the charge potential e. Thereafter, when the charge control signal d becomes high potential the transistor Q43 is turned on and transistors Q44, Q45, Q50, Q51 are turned off. And, at this time, since the discharge control signal d is low potential the transistor Q48 is turned off in order to turn the transistors Q46, Q47 on. Thereby, the charge potential e of the capacitor C1 is discharged slowly through the transistor Q46 so as to be decreased, as shown in FIG. 9I.

In the meantime, in a state that the discharge control signal d is high potential, the transistor Q53 is turned on and the transistors Q58, Q59 are turned on, at this moment, since the charge potential e of the capacitor C1 increases instantly as described in the above description so as to be higher than the reference voltage $V_R$, the transistor Q56 is turned on so that transistors Q54, Q55 are turned on, thereby transistors Q60, Q61, Q62 are turned off. And, in a state that the discharge control signal d is low potential, the transistor Q53 is turned off and transistors Q58, Q59 are turned off, so that transistors Q54–Q57, Q60–Q62 are turned off. Where, since the electric current ratio of the transistors Q49, Q52 is set at 2:1, the charge time TA and the discharge time TB over the reference voltage $V_R$ have a relation of 2TA-TB.

Figure 9J:

Meanwhile, since the charge potential e of the capacitor C1 which is charged and discharged as above is applied to a non-inverting input terminal of a comparator 24 and compared with the reference voltage $V_R$ which is applied to an inverting input terminal of the comparator 24, a turn-off decision signal f as shown in FIG. 9J is outputted from the output terminal of the comparator 24.

Figure 9K:
Figure 9L:
Figure 9M:

The turn-off decision signal f thus outputted is applied to bases of transistors Q72, Q73, Q74 of a turn-off signal generating section 20 so that the transistors Q72, Q73, Q74 are turned on when the turn-off decision signal f is in a low potential state. At this moment, since the position detection signals a, b, c which are output signals of the comparators 11, 12, 13 are applied to base sides of transistors (Q66, Q71), (Q67, Q68), (Q69, Q70), said position detection signals a, b, c are outputted from a connecting point at the collector side of the transistors (Q66, Q67), (Q68, Q69), (Q70, Q71) with the logic combination of $\overline{a+b}$, $\overline{b+c}$, $\overline{c+a}$, and then applied in common to collectors of transistors (Q76, Q78), (Q77, Q79), (Q75, Q80) and bases of transistors (Q82, Q83), (Q84, Q85), (Q81, Q85), respectively. And, at this time, when a forward control signal F of high potential is applied, transistors Q78, Q79, Q80 are turned on and transistors Q82, Q84, Q86 are turned off. And since a reverse control signal R is low potential, transistors Q75, Q76, Q77 are turned off. Thereby, only when transistors Q81, Q83, Q85 are turned off by the low potential state of the logic signals $\overline{a+c}$, $\overline{a+b}$, $\overline{b+c}$, and transistors Q72, Q73, Q74 are turned on by the turn-off decision signal f, high potential signals are outputted from collectors of the transistors Q81, Q83, Q85 as shown in FIG. 9K to FIG. 9M and applied as turn-off signals h, i, j.

That is, the turn-off signals h, i, j are outputted as following equations (9), (10), (11).

$$h = \overline{f} \cdot (a + c) \qquad (9)$$

$$i = \overline{f} \cdot (a + b) \qquad (10)$$

$$j = \overline{f} \cdot (b + c) \qquad (11)$$

Meanwhile, when a high potential reverse control signal R is applied transistors Q75, Q76, Q77 are turned on and transistors Q81, Q83, Q85 are turned off, and at this time since the forward control signal F is in a low potential state, so that transistors Q78, Q79, Q80 are turned off. Accordingly, the turn-off signals h, i, j are outputted in accordance with the above described manner as the following equations (12), (13), (14).

$$h = \overline{f} \cdot (a + b) \qquad (12)$$

$$i = \overline{f} \cdot (b + c) \qquad (13)$$

$$j = \overline{f} \cdot (a + c) \qquad (14)$$

Figure 9N:
Figure 9O:
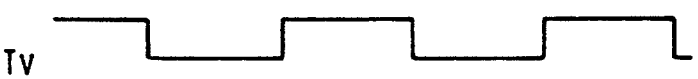
Figure 9P:

The turn-off signals h, i, j thus outputted from the turn-off signal generating section 20 are applied to bases of transistors Q14, Q15, Q16 to turn on the transistors Q14, Q15, Q16, causing power transistors Q11, Q12, Q13 to be turned off. That is, in a state that the turn-off signals h, i, j are outputted as shown in FIGS. 9K to 9M under the forward rotation state, the turn-off signals h, i, j force the transistors Q14, Q15, Q16 to be turned on in a high potential state, so that base potential of the power transistors Q11, Q12, Q13 become low potential as shown in FIGS. 9N to 9P, thereby turning off the power transistors Q11, Q12, Q13.

Hereinafter, a case that a motor rotates in a forward direction by the changeover of rotation direction while rotating in reverse direction will be described with reference to wave form views of FIGS. 10A. to 10Q.

Figure 10A:
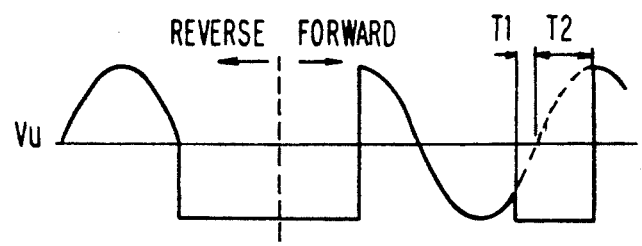
Figure 10B:
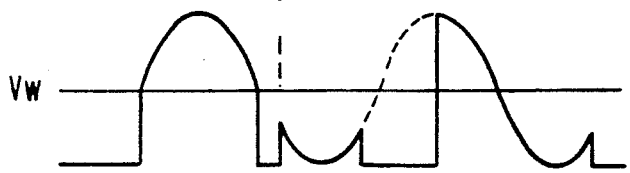
Figure 10C:
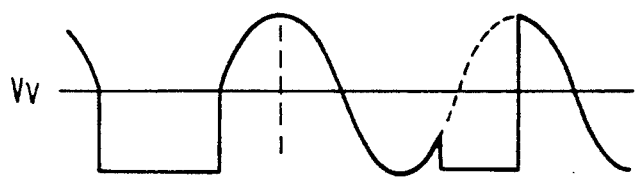
Figure 10D:
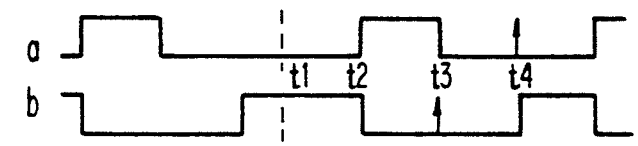
Figure 10E:
Figure 10F:
Figure 10G:
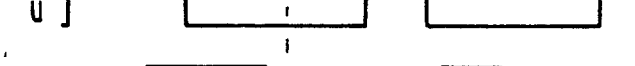
Figure 10H:
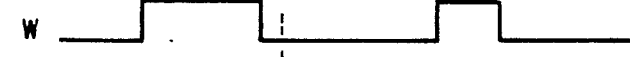
Figure 10I:
Figure 10J:
Figure 10K:
Figure 10L:
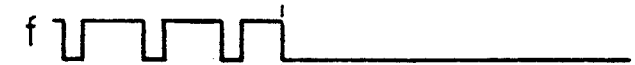
Figure 10M:
Figure 10N:
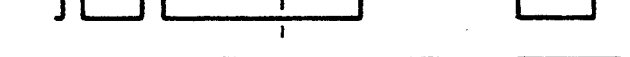
Figure 10O:
Figure 10P:
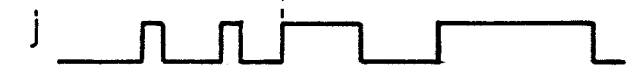
Figure 10Q:

In FIGS. 10A to 10Q, left side of time period t1 represents output wave form of each section in reverse rotation and right side of time period t1 shows output waveform of each section in forward rotation.

In reverse rotation, when the back electromotive force of the phase-corresponding coils Lu, Lw, Lv is met with FIGS. 10A, 10B and 10C, the position detection signals a, b, c which are output signals of the comparators 11, 12, 13 are outputted as shown in FIGS. 10D, 10E and 10F and the turn-on signals $\overline{u}$, $\overline{w}$, $\overline{v}$ which are output signals of the comparators 14, 16, 15 are outputted as inverted waveforms as shown in FIGS. 10G, 10H and 10I. And, signals u, v, w, as shown in FIGS. 10G, 10H and 10I are outputted at the connecting points P1, P2, P3 of a rotation direction control section 17 by the turn-on signals $\overline{u}$, $\overline{v}$, $\overline{w}$, a high potential reverse control signal R and a low potential forward control signal F and applied to a charge/discharge control section 18. Accordingly, at this time, since a charge control signal d is outputted at the charge/discharge control section 18, as shown in FIG. 10J, a turn-off decision signal f is outputted from the charge/discharge section 19, as shown in FIG. 10K, and applied to the turn-off signal generating section 20, thereby the turn-off signals h, i, j, as shown in FIGS. 10L, 10M, and 10N, are outputted from the turn-off signal generating section 20 so that the transistors Q14, Q15, Q16 are turned on. Accordingly the base potentials of the power transistors Q11, Q12, Q13 appear as shown in FIGS. 10O, 10P, and 10Q, forcing the power transistors Q11, Q12, Q13 to be turned off.

When changing over the rotational direction from such a reverse rotation to a forward rotation, at this moment (t1), since a charged current does not flow in the charge/discharge section 19 as the charge control signal d is kept high potential, as shown in FIG. 10J, the charge potential e of the capacitor C1 becomes lower than the reference voltage $V_R$ so that the turn-off decision signal f which is an output signal of the comparator 2 is kept low potential, as shown in FIG. 10K. Accordingly, transistors Q72, Q73, Q74 of the turn-off signal generating section are continuously kept at a turn-on state. And, at this time, since the forward rotation control signal F is in a high potential state and the reverse rotation control signal is low potential state as it is a forward rotation state, transistors Q78, Q79, Q80 are turned on and thus transistors Q82, Q84, Q86 are kept turned off, and also transistors Q75, Q76, Q77 are turned off so that logic signals (c+a), (a+b), (b+c) of the position detection signals a, b, c are outputted as turn-off signals h, i, j. Thus, the U-phase coil Lu is turned on at the region (t1-t2) and electric current does not flow through the V-phase coil Lv and W-phase col Lw. Meanwhile, since the back electromotive force Vw of the W-phase coil Lw becomes instantly higher than the back electromotive force Vv of the V-phase coil Lv at the time period t2, the position detection signal a becomes instantly high potential, as shown in FIG. 10d, and the turn-off signal h becomes high potential as shown in FIG. 10L by the high potential position detection signal c, causing the U-phase coil Lu to be turned off. However, the position detection signal a becomes high potential as shown in FIG. 10D at the same time the U-phase coil Lu is turned off, and the position detection signal c becomes again low potential as shown in FIG. 10F, and at this time, since the reverse electromotive force Vw of the W-phase coil Lw becomes lower than the common voltage Vcom, the U-phase coil Lu and V-phase coil Lv are turned off and only W-phase coil Lw is turned on. Eventually, the turn-off signals h, i are kept high potential at the region (t2-t3), and the turn-off signal j is kept low potential so that only W-phase coil Lw is turned on. Meanwhile, since the time period t3 represents an instant that the back electromotive force Vv of the V-phase coil Lv becomes higher than the back electromotive force Vu of the U-phase coil Lu, the position detection signal c becomes instantly high potential as shown in FIG. 10F, causing the W-phase coil Lw to be turned off. At the same time, since the back electromotive force Vw of the W-phase coil Lw becomes higher than the back electromotive force Vv of the V-phase coil Lv, the position detection signal c becomes high potential as shown in FIG. 10F, and at this time the back electromotive force Vv of the V-phase coil Lv becomes lower than the common voltage Vcom, causing the V-phase coil Lv to be turned on. Eventually, only the V-phase coil Lv is turned on at the region (t3-t4).

And, since the time period t4 represents an instant that the back electromotive force Vv of the V-phase coil Lv becomes higher than the back electromotive force Vw of the W-phase coil Lw, the position detection signal a becomes instantly high potential. Thus the V-phase coil Lv is turned off, and the back electromotive force Vv of the V-phase coil Lv becomes higher than the reverse electromotive force Vu of the U-phase coil Lu, so that the position detection signal b becomes high potential as shown in FIG. 10E. At this time, the back electromotive force Vu of the U-phase coil Lu becomes lower than the common voltage Vcom, causing the U-phase coil Lu to be turned on.

Eventually, in case that the rotational direction is changed from the reverse direction to the forward direction, a reverse torque is generated at the 90° electric angle regions T2 as can be confirmed by the respective back electromotive forces Vu, Vv, Vw as shown in FIGS. 10A, 10B and 10C, and a forward torque is generated at the 30° electric angle regions T1, so that the reverse torque is higher than the forward torque, thereby executing a braking operation. And, since the back electromotive forces, Vu, Vv, Vw comprises a speed W (rad/sec) which is a rotation information, together with a rotor position information, it can be possible to detect the rotational speed of DC motor by use of the rotation information.

Meanwhile, the back electromotive force Vu produced at the U-phase coil Lu becomes $2\pi$ as an electric angle, and in case of 2-phase motor, the back electromotive force Vu becomes a mechanical angle $2\pi$ when a rotor rotates one time, while in case of 12-phase motor an electric angle $12/2 \times 2\pi = 12\pi$ corresponds to a mechanical angle $2c$. This means that the waveforms of the back electromotive forces Vu, Vv, Vw which are produced at the phase-corresponding coils Lu, Lv, Lw during one rotation of the rotor, have periods of six times. And, since the period of the back electromotive forces Vu, Vv, Vw is a function of the speed W (rad/sec) of DC motor, the period of the back electromotive forces Vu, Vv, Vw are inversely proportional to the speed. Accordingly, in case that the phase number of motor is multi-polarized one (for example, 2-phase, 12-phase, . . . ), it is possible to obtain a speed detection having sufficient resolution so that the speed detection can be executed from the back electromotive forces. Such an operation will be described in detail with reference to FIG. 8 and FIG. 11.

When back electromotive forces Vu, Vv, Vw, as shown in FIG. 11A are generated at the phase-corresponding coils Lu, Lv, Lw, the back electromotive forces Vu, Vv, Vw pass through diodes D1, D4, D7, respectively, as described above, and applied to inverting input terminals of the comparators 14, 15, 16 after having passed through resistors R7, R8, R9, respectively, and then compared with the common voltage Vcom which is applied to non-inverting terminals of the comparators 14, 15, 16, whereby the comparators 14, 15, 16 produce phase-corresponding turn-on signals $\bar{u}$, $\bar{v}$, $\bar{w}$ as shown in FIGS. 11B, 11C and 11D as an output. The turn-on signals $(\bar{u}, \bar{v})$, $(\bar{u}, \bar{v})$, $(\bar{v}, \bar{w})$ among the phase-corresponding turn-on signals u, v, w are applied directly to input terminals of AND gates AND1, AND2, AND3, respectively, and the turn-on signals $\bar{v}$, $\bar{w}$, $\bar{u}$ are applied to other input terminals of the AND gates AND1, AND2, AND3 through inverters I1, I2, I3, respectively. Accordingly, a high potential signal is outputted from the AND gate AND1 in case when the turn-on signals $\bar{u}$, $\bar{w}$ are in a high potential state and the turn-on signal $\bar{v}$ is in a low potential state, and a high potential signal is outputted from the AND gate AND2 in case when the turn-on signals $\bar{u}$, $\bar{v}$ are in a high potential state and the turn-on signal $\bar{w}$ is in a low potential state. Similarly, a high potential signal is outputted from the AND gate AND3 in case when the turn-on signals $\overline{u}$, $\overline{w}$ are in a high potential state and the turn-on signal $\overline{u}$ is in a low potential state. The signals which are outputted from the AND gates AND1-AND3 are added with each other at an OR gate OR1, and each time that a high potential signal is outputted from one of the AND gates AND1-AND3, a high potential signal, as shown in FIG. 11E, is outputted from the OR gate OR1 and applied as a frequency generating signal FG. Since this frequency generating signal FG is in proportion to the rotational speed of DC motor, it can be possible to detect the rotational speed of DC motor by means of the frequency generating signal FG.

As described above in detail, the present invention has effects that since electric current flows in the respective phase-corresponding coils of a brushless motor at an electric angle of 180°, the maximum rotational speed of the brushless motor is increased, the torque ripple produced less than the conventional method, and the rotational torque of motor is increased, whereby it is possible to obtain the high speed function in case of applying it to products such as a headphone-type stereophonic product or the like. Also the rotational direction changeover of motor can be more quickly executed because a braking operation is automatically carried out in case of changing the rotational direction.

Moreover, according to the present invention, since the frequency generating signal is produced by the back electromotive forces which are generated at the phase-corresponding coils, the resolution is increased so that it is possible to be apply to to motors that require more precise servo properties, and also it is possible to minimize the motor by not requiring the frequency generating coil.

What is claimed is:

1. A driving circuit for a sensorless and brushless DC motor comprising:
    a plurality of phase-corresponding coils having respective back electromotive forces when the motor is activated;
    a first plurality of comparators for comparing said back electromotive forces and outputting a plurality of position detection signals;
    a second plurality of comparators for comparing said back electromotive forces with a common voltage and outputting phase-corresponding turn-on signals;
    a first plurality of transistors connected to said phase-corresponding coils for turning on said phase corresponding coils when receiving the turn-on signals;
    a rotation direction control section having inputs for receiving said phase corresponding turn-on signals and a forward/reverse direction control signal, and outputs for outputting a plurality of direction control signals;
    a charge/discharge control section having inputs for receiving said direction control signals and said position detection signals, and outputs for outputting charge/discharge control signals;
    a charge/discharge section connected to the outputs of the charge/discharge control section for outputting a turn-off decision signal;
    a turn-off signal generating section having inputs for receiving said turn-off decision signal, said position detection signals and said forward/reverse direction control signal and having outputs for outputting a plurality of turn-off signals; and
    a second plurality of transistors connected to said first plurality of transistors for turning off said first plurality of transistors when receiving said turn-off signals.

2. The circuit according to claim 1, wherein said rotation direction control section further comprises means for inverting said phase-corresponding turn-on signals and outputting a first predetermined order of rotation direction control signals when said forward/reverse direction control signal is high and outputting a second predetermined order of rotation direction control signals when said forward/reverse direction control signal is low.

3. The circuit according to claim 1 wherein said charge/discharge control section further comprises means for outputting a first charge/discharge control signal when a first particular logic combination of the rotation direction control signals and the position detection signals are inputted and a second charge/discharge control signal when a second particular logic combination of the rotation direction control signals and the position detection signals are inputted.

4. The circuit according to claim 1 wherein said charge/discharge section further comprises a capacitor having a charging and discharging time wherein said charging time is twice as quick as said discharging time, and a comparator for outputting the turn-off decision signal in response to a comparison of a charging potential on said capacitor with a reference voltage.

5. The circuit according to claim 1 wherein said turn-off signal generating section further comprises means for outputting said turn-off signals according to predetermined logic combinations of the inputted position detection signals, the inputted turn-off decision signal and the forward/reverse direction control signal.

6. The circuit according to claim 1 wherein the circuit further comprises a frequency generating section having inputs for receiving said phase-corresponding turn-on signals and outputs for outputting a high potential frequency generating signal only when two turn-on signals among the phase-corresponding turn-on signals are inputted.

7. A driving method for a sensorless and brushless DC motor having a rotor and phase-corresponding coils with back electromotive forces, comprising the steps of:
    obtaining position detection signals of the rotor by comparing the back electromotive forces;
    obtaining phase-corresponding turn-on signals for driving current through said phase-corresponding coils by comparing said back electromotive forces with a common voltage;
    obtaining rotation direction control signals in an order dependent upon the direction of rotation of the motor by processing said phase-corresponding turn-on signals and a forward/reverse direction control signal;
    obtaining charge/discharge control signals by processing said position detection signals and said rotation direction control signals;
    obtaining a turn-off decision signal by processing the charge/discharge control signals;
    obtaining a plurality of turn-off signals for forcing the turning off of current through the phase-corresponding coils by processing the position detection signals, the forward/reverse direction control signals and the turn-off decision signal; and passing current through on the phase-corresponding coils at an electric angle of 180°.

8. A speed detecting method for a sensorless and brushless DC motor having three phase-corresponding coils with back electromotive forces, comprising the steps of:

obtaining a separate phase-corresponding turn-on signal for turning on driving current for each of the phase-corresponding coils at an electric angle of 180° by comparing the back electromotive forces of the phase-corresponding coils with a common voltage; and outputting a high potential frequency generating signal when two of the phase-corresponding turn-on signals are at a high potential and outputting a low potential frequency generating signal when two of the phase-corresponding turn-on signals are at a low potential.

9. The method as claimed in claim 8, comprising the further steps:

inverting the phase-corresponding turn-on signals and then ANDing the inverted turn-on signals in response to high levels of predetermined different combinations of phase-corresponding turn-on signals, and ORing the ANDed signals and then outputting a high potential frequency generating signal only when two turn-on signals among the phase-corresponding turn-on signals are in a high potential state.

* * * * *